(12) United States Patent
Fränkle et al.

(10) Patent No.: US 7,044,992 B2
(45) Date of Patent: May 16, 2006

(54) PARTICLE FILTER FOR EXHAUST GASES OF INTERNAL COMBUSTION ENGINE ENGINES

(75) Inventors: Gerhard Jürgen Fränkle, Remshalden (DE); Hermann Josef Schulte, Menden (DE); Hans Peter Frisse, Herzogenrath (DE); Carsten Jutka, Menden (DE); Jochen Koll, Arnsberg (DE); Franz Kraft, Balve (DE)

(73) Assignee: HJS Fahrzeugtechnik GmbH & Co., Menden (DE)

( * ) Notice: Subject to any disclaimer, the term of this patent is extended or adjusted under 35 U.S.C. 154(b) by 256 days.

(21) Appl. No.: 10/740,652

(22) Filed: Dec. 18, 2003

(65) Prior Publication Data
US 2004/0128988 A1   Jul. 8, 2004

Related U.S. Application Data

(63) Continuation-in-part of application No. PCT/EP02/06098, filed on Jun. 4, 2002.

(30) Foreign Application Priority Data

Jun. 18, 2001 (DE) ............................... 101 28 936
Jun. 18, 2001 (DE) ............................... 102 28 937
May 25, 2002 (DE) ............................... 102 23 452

(51) Int. Cl.
*B01D 46/02* (2006.01)

(52) U.S. Cl. ............... 55/523; 55/282.3; 55/385.3; 55/498; 55/499; 55/510; 55/521; 55/524; 55/529; 55/DIG. 10; 55/DIG. 30; 60/311

(58) Field of Classification Search .............. 55/282.2, 55/282.3, 361, 385.3, 497, 498, 499, 501, 55/510, 521, 523, 529, DIG. 10, DIG. 30, 55/524; 60/311; 96/424, 425, 426
See application file for complete search history.

(56) References Cited

U.S. PATENT DOCUMENTS

| 4,056,375 | A | * | 11/1977 | Ringel et al. ................ 55/521 |
| 4,154,587 | A | | 5/1979 | Gerok |
| 4,359,864 | A | * | 11/1982 | Bailey ................ 55/DIG. 30 |
| 4,562,039 | A | | 12/1985 | Koehler |
| 4,924,561 | A | | 5/1990 | Yoneyama |
| 4,975,099 | A | * | 12/1990 | Kaser et al. ................ 55/523 |
| 5,259,190 | A | * | 11/1993 | Bagley et al. ............. 55/523 |
| 5,851,250 | A | * | 12/1998 | Sugie et al. ................ 55/523 |
| 5,961,931 | A | * | 10/1999 | Ban et al. ................... 55/521 |

FOREIGN PATENT DOCUMENTS

| DE | 32 28 325 | 2/1984 |
| DE | 36 37 516 | 4/1988 |

(Continued)

*Primary Examiner*—Jason M. Greene
(74) *Attorney, Agent, or Firm*—Klaus J. Bach

(57) ABSTRACT

In a particle filter for exhaust gases of internal combustion engines, particularly Diesel engines, including a filter body with filter pockets which are formed from sinter metal sheets and are wedge-shaped with an opening at the blunt end and edges formed by converging pocket side walls and arranged adjacent one another such that, between adjacent filter pockets, corresponding opposite spaces are formed with openings facing in a direction opposite to the openings at the blunt end, the filter pockets side walls are spaced from one another by widening means extending along at least an edge of the filter pockets so as to increase the width of the space between the side walls of the filter pockets.

10 Claims, 9 Drawing Sheets

FOREIGN PATENT DOCUMENTS

| DE | G 90 10 910.4 | 12/1990 |
| DE | 41 37 738 | 5/1993 |
| DE | 44 03 450 | 4/1995 |
| DE | 195 03 067 | 8/1996 |
| DE | 36 08 801 | 9/1997 |
| DE | 36 37 516 C1 * | 4/1998 |
| DE | 198 10 738 | 4/1999 |
| DE | 195 24 399 | 1/2000 |

* cited by examiner

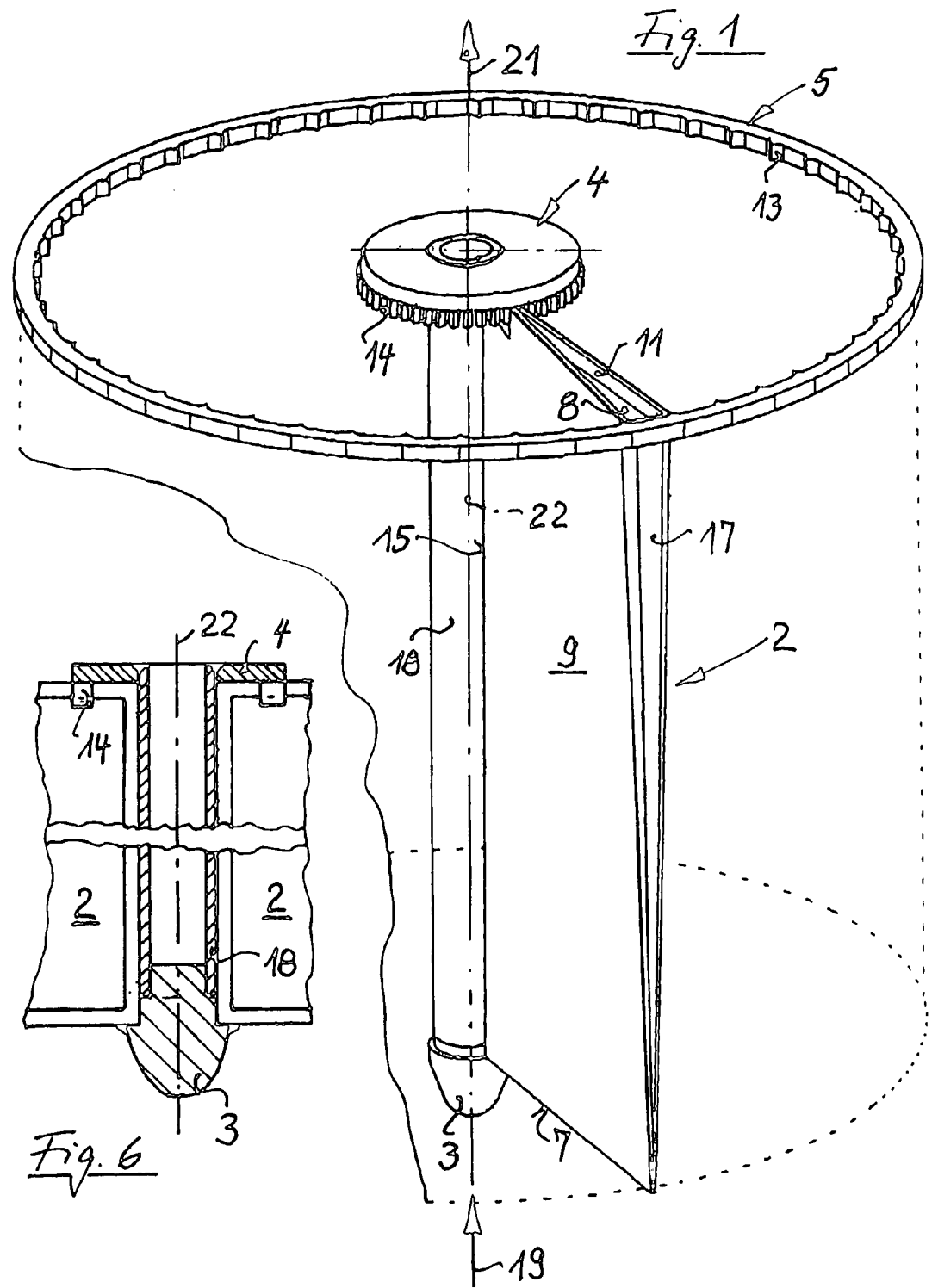

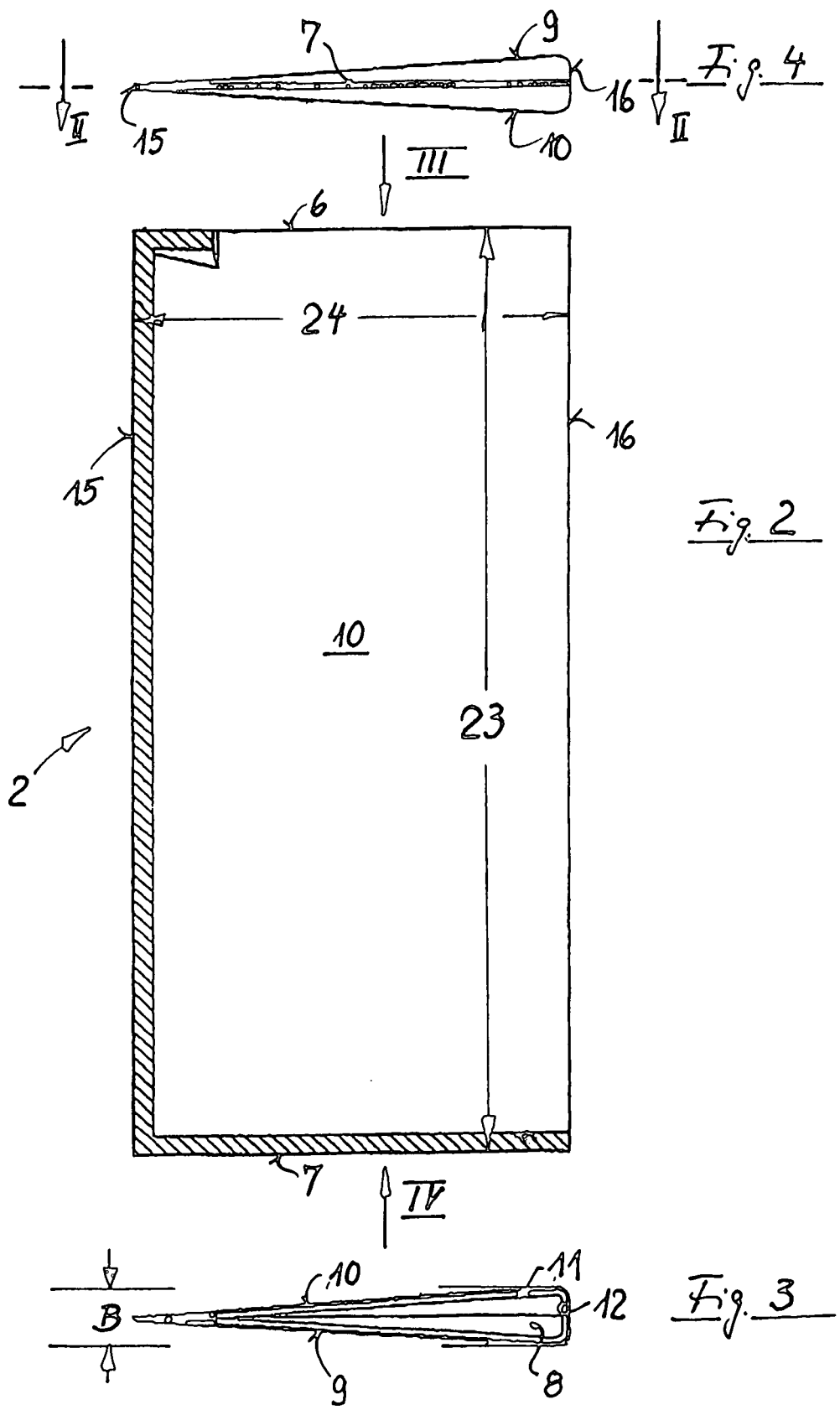

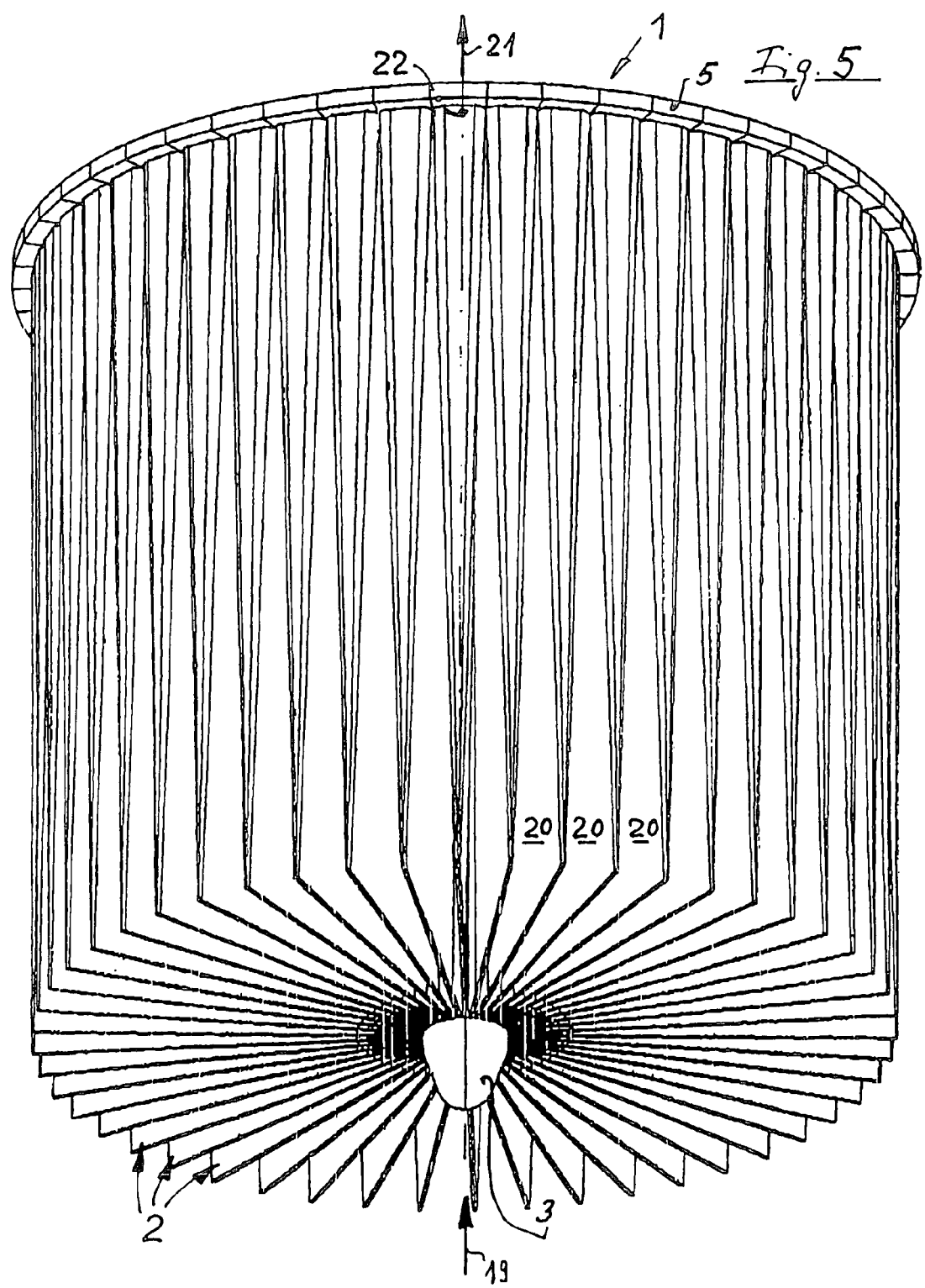

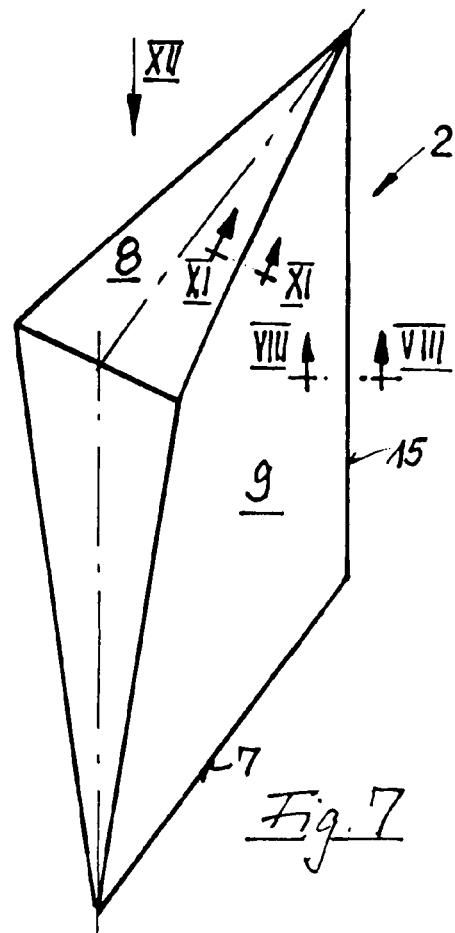
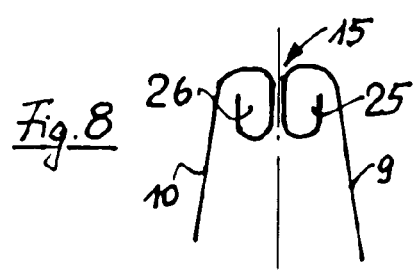
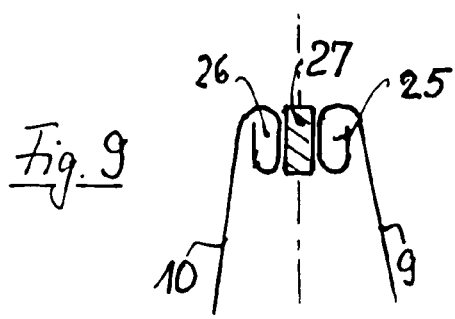
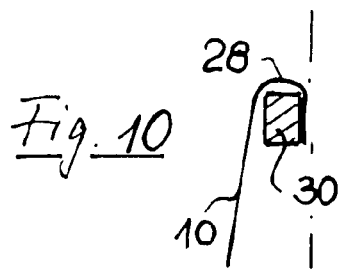
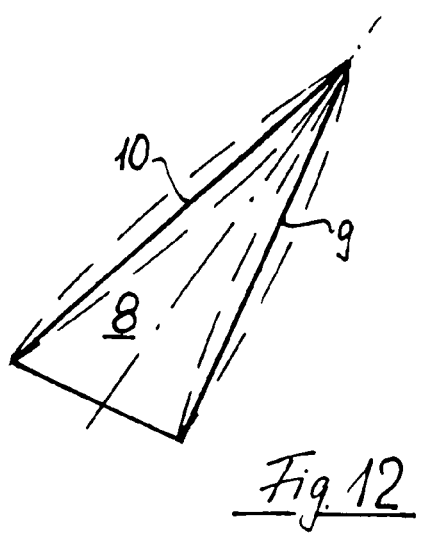
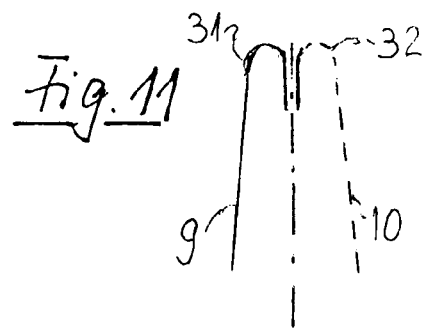

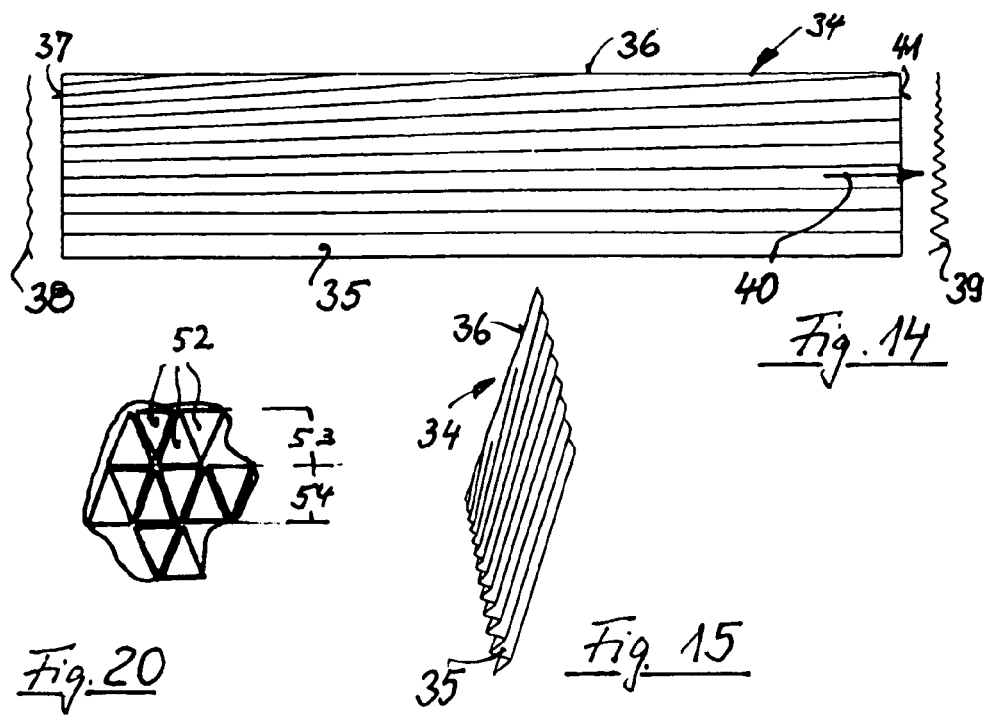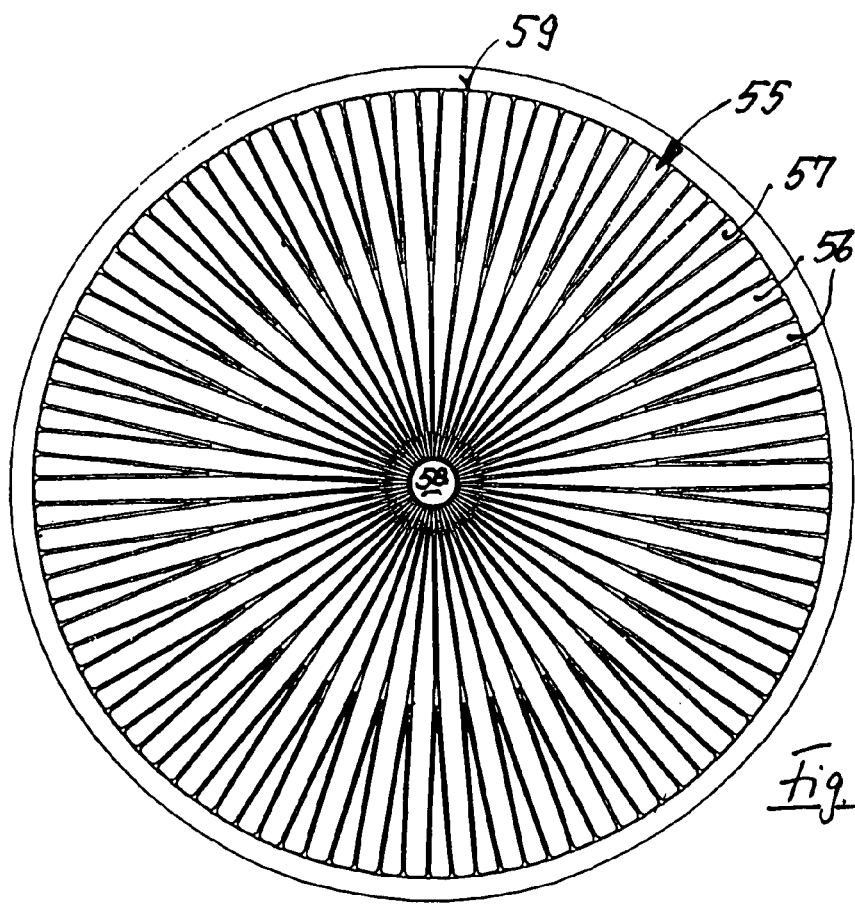

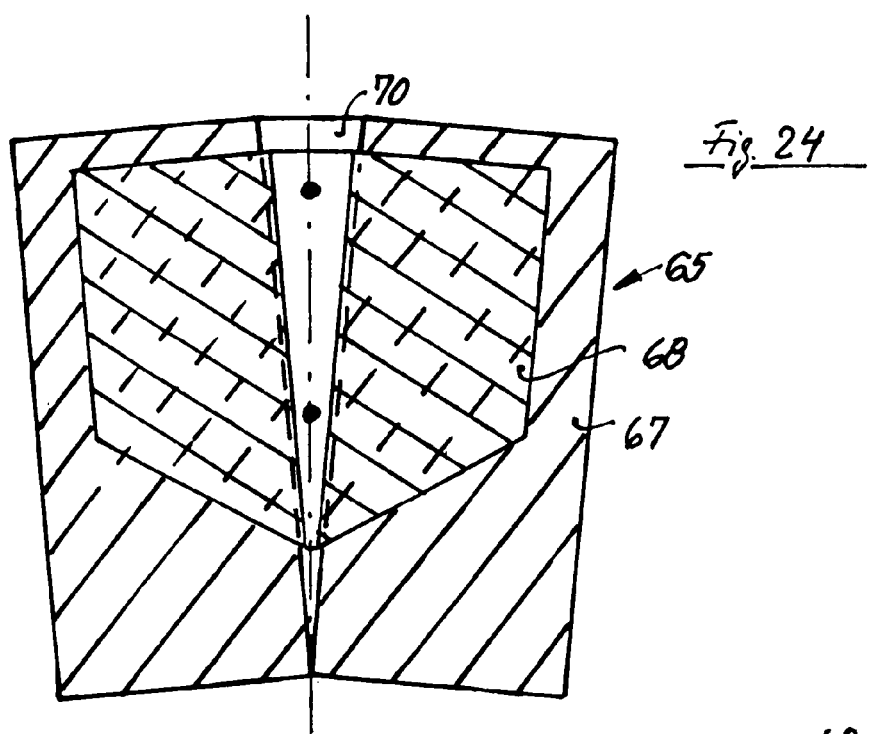
Fig. 24
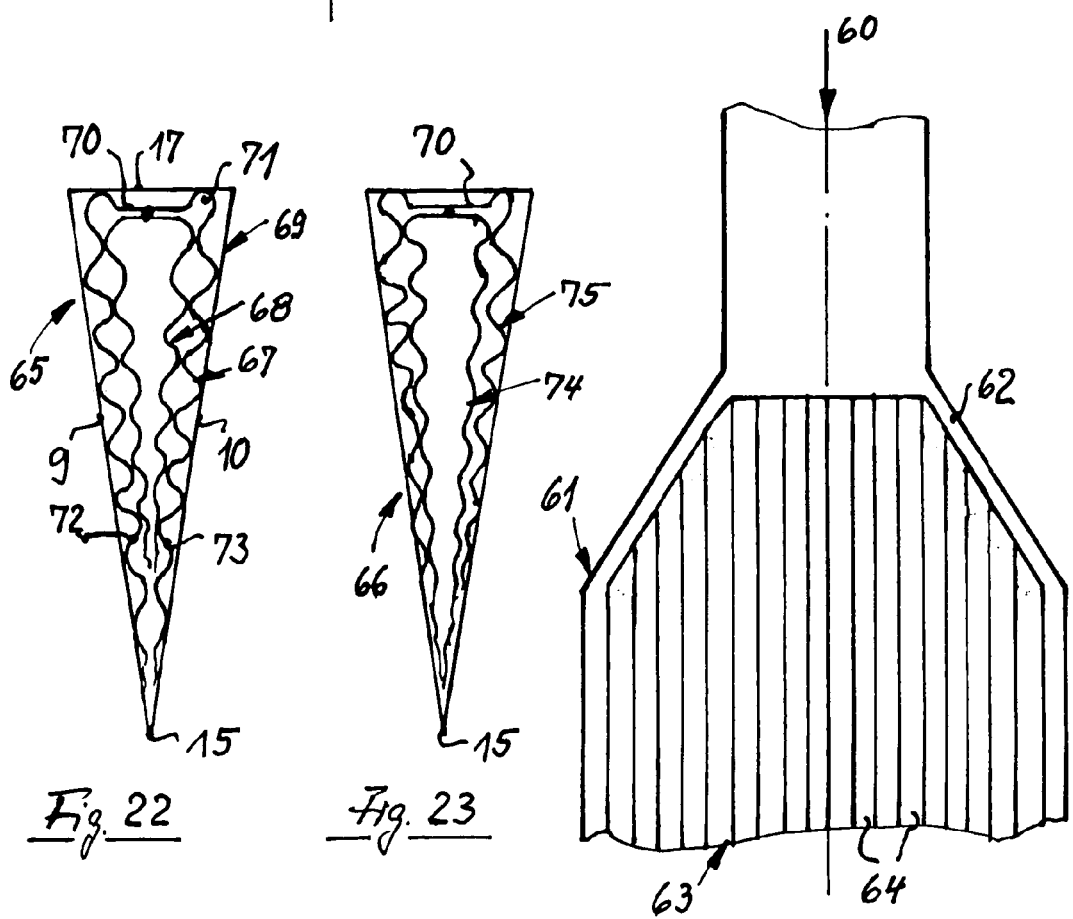
Fig. 22
Fig. 23
Fig. 21

PARTICLE FILTER FOR EXHAUST GASES OF INTERNAL COMBUSTION ENGINE ENGINES

This is a Continuation-In-Part Application of International Application PCT/EP02/06098 filed Jun. 4, 2002 and claiming the priority of German applications 102 28 937.5 filed Jun. 18, 2001. 101 28 936.7 filed Jun. 18, 2001 and 102 23 462.3 filed May 25, 2002.

BACKGROUND OF THE INVENTION

The invention relates to a particle filter for exhaust gases of internal combustion engines, particularly of diesel fuel operated internal combustion engines, which particle filters include a filter body with filter pockets formed by sinter metal sheets.

Particle filters of the above-mentioned type are known from DE 198 10 738 C1. They operate with filter pockets which include filter areas of sinter metal through which the exhaust gases flow and which include a central recess. The filter pockets are stacked on top of one another to form a filter body and are joined via adjacent side walls in the area of the pocket opening adjacent the central recess, so that a flow along the filter walls is obtained. The filter walls are provided alternately with spacer profiles by way of which they abut one another. Based on the particular principle, particle filters of such a design are limited as far as their spatial configuration is concerned taking particularly manufacturing aspects into consideration.

From DE 36 37 315 C1, dust filters are known which include as filter bodies wedge-shaped filter pockets which have a triangular cross-section and are provided at the obtuse wedge end with a pocket opening and which have wedge edges formed by converging pocket side walls wherein one wedge edge is disposed opposite the obtuse wedge end and the other extends along a longitudinal side toward the apex of the obtuse wedge end. With regard to the flexible filter material used, the respective filter pockets are provided in their interior with gas permeable support structures adapted to the contour of the filter medium, in order to maintain the shape of the dust filters.

It is the object of the invention to provide a particle filter of the type described above, but which has a high filter output with little space requirements. It should also be highly variable as to the configuration of the filter body and provide for advantageous manufacturing conditions.

SUMMARY OF THE INVENTION

In a particle filter for exhaust gases of internal combustion engines, particularly Diesel engines, including a filter body with filter pockets which are formed from sinter metal sheets and are wedge-shaped with an opening at the blunt end and edges formed by converging pocket side walls and arranged adjacent one another such that, between adjacent filter pockets, corresponding opposite spaces are formed with openings facing in a direction opposite to the openings at the blunt end, the filter pockets side walls are spaced from one another by widening means extending along at least an edge of the filter pockets so as to increase the width of the space between the side walls of the filter pockets.

With the filter body according to the invention the dimensioning proportions can be established which result in an advantageous ratio of the filter space to the filter surface, particularly when considering the requirements for combustion engines and especially with regard to carbon particles deposited on the filter surface and the storage of the engine oil ashes which remain irreversibly in the filter upon combustion of the carbon deposits.

The invention provides additionally for the possibility to adapt the volumes of the filter pockets and the opposite chambers associated therewith and delimited thereby to the special operating conditions of the particle filters according to the invention. As a result, by design adaptations, different deposit amounts on the filter surface of impurities and also combustion residues can be accommodated and also for example, different incident flow conditions resulting from the arrangement of the particle filter in the vehicle.

With regard to the change of the volume relationships between the filter pockets and the opposite chambers, the filter pockets can be changed with respect to their distances from one another and also with respect to their spatial arrangement and their shape. The variations of the shape of the filter pockets with respect to the contour of the side walls and particularly with respect to the form of the truncation of the longitudinal edge are possible without additional design expenses. Particularly the design of the edge areas of the side walls of the filter pockets can be utilized for these purposes by bending them over or folding them. At the same time, improved conditions for welding the edges can be provided thereby. The thickening or bridge formation by the bending or folding of the edges may be combined with the introduction of insert pieces, particularly in the form of insertion strips which may be suitable for an improvement of the welding conditions and/or for the reinforcement of the edge areas and their truncation.

A slim acutely angled configuration of the filter pockets, particularly in connection with a thin-walled structure for the side walls containing the filter areas, make the use of a support and/or gas conducting insert, below called spacer, suitable for the respective filter pockets. By way of this insert, also the flow conditions within the filter pocket may be influenced with a view to improving the gas flow and preventing interference from different incident flow conditions. In addition, such an insert may also be used as carrier for catalysts and similar compounds. Furthermore, such an insert may also operate as a thermal buffer for an equalization of temperature peaks. The spacer consists in accordance with the invention of a gas-impermeable material. It can therefore not follow the contours of the filter material, as this would inhibit the passage of gas through the filter material.

In connection with the spacer also measures may under certain circumstances be provided for the injection of reduction mediums in a suitable manner into the acute front area of the filter pockets which are subjected to the oncoming gas flow. To this end however, also a separate pipe system may be attached to the spacer.

For the configuration of the spacer, a wave-like or pleated area structure thereof is particularly suitable whereby at the same time gas flow channels can be formed. The gas flow channels may be interconnected in such a way that, by providing slots in a metal sheet and the alternate punching out of wave structures, the filter gases may mix. This has the advantage that the gas entering at the lower edge of the filter pocket edge can be distributed to higher areas of the pockets, so that the gas discharge flow can be dynamically optimized by equalization. Such a gas flow can be achieved in accordance with the invention also by punching out certain areas of a spacer metal sheet, wherein this punched out areas are provided in the form of spacers in such a way that they fix the spacer metal sheet in the center of the filter pockets.

In accordance with the invention also a spacer consisting of several layers may be utilized, particularly if the spacer surface area is to be increased to such an extent that the surface area, which is provided thereby and which is made catalytically active by corresponding procedures, is sufficient for providing a subsequent catalytic reaction. The spacer may, in accordance with the invention, consist of different high temperature resistant materials, particularly of metals, which may be used to form spacers in the form of metal sheets or foams.

With the high flexibility concerning the configuration of the filter body achieved by the invention, the filter body can be extended to a certain extent into the inlet- or discharge cone of the particle filter, whereby the available space is better utilized. Particularly in these areas, here particularly at the inlet area, it is suitable to provide a coating with materials, which lower the carbon combustion temperature whereas, at the clean gas side opposite the raw gas end, a coating with a material providing for a nitrogen oxide reduction may be provided.

The configuration of the filter pockets in the form of wedge elements, which have a narrow cross-section and are relatively long and which can advantageously be nested into one another, permits furthermore the provision of different configurations of the filter bodies without the need for changing the basic shape of the filter pockets. It also provides for advantageous conditions for additional temperature exposure of the filter pockets particularly with the incident raw gas, which is directed to the counter-chambers delimited by the filter pockets. In the arrangement according to the invention, the filter pockets extend practically finger-like in the direction toward the inlet gas flow. The edge ends of the wedge-like filter pockets also provide for a uniform gas flow over the surface areas of the filter pockets along the full length thereof.

In accordance with the invention, filter pockets can also be combined to a filter body using simple means. To this end, particularly the edges of the filter body formed by the filter pockets are expediently surrounded by an engagement ring which, at the same time, provides for mutual support between the individual filter pockets and between the filter bodies and a respective containment, particularly a filter housing, and which can serve in the plane which includes the pocket openings as a seal between the raw gas and the purified gas sides. Particularly, in connection with the invention, the filter pockets may be welded together in the discharge area and if appropriate also to the engagement ring by a casting procedures using liquid metal. For this purpose, the filter body may, expediently after being pre-heated, be immersed into a metal melt.

Further details and features of the invention will become more readily apparent from the following description of preferred embodiments on the basis of the accompanying drawings.

BRIEF DESCRIPTION OF THE DRAWINGS

FIG. 1 shows in a perspective representation, the isolated arrangement of a filter pocket in relation to the support components of a particle filter which, in a rotational symmetrical arrangement, includes a plurality of correspondingly arranged filter pockets, FIG. 2 is a simplified cross-sectional representation of a filter pocket according to FIG. 1, FIGS. 3 and 4 are front views of the filter pockets according to FIG. 2 shown in the direction of the arrows III and IV, FIG. 5 shows a complete particle filter of a design according to the representation of FIG. 1, FIG. 6 shows the center jointure of the particle filter in a simplified partial sectional representation, FIG. 7 is a perspective schematic representation of a filter pocket, FIGS. 8–10, show, in a sectional view taken along line VIII—VIII of FIG. 7, various embodiments of side wall edges folded inwardly, FIG. 11 is a sectional view taken along line XI—XI of FIG. 7 showing a side wall edge folded outwardly, FIG. 12 shows schematically a top view along arrow XII in FIG. 7, FIGS. 14 and 15 show inserts for the filter pockets in the form of a spacer, FIG. 18 is a view of a basic particle filter structure showing, in principle, the sectioning of the wedge area, FIG. 20 shows schematically a particle filter arrangement with an irregular contour using the filter pockets according to the invention, FIG. 21 shows schematically the arrangement of a filter body constructed from filter bodies for a particle filter whose filter housing includes an inlet cone into which the filter bodies extend, FIGS. 22 and 23 are schematic views of the different embodiments of filter pockets in accordance with the invention having a front side provided with pocket openings and including inserts for the filter pockets in the form of spacers, FIG. 24 shows a development of a multi-layer spacer as presented in FIG. 2, wherein the layers are joined and pleated, FIG. 25 another representation of a filter pocket with a multi-layer spacer inserted.

DESCRIPTION OF PREFERRED EMBODIMENTS

Figure 13:
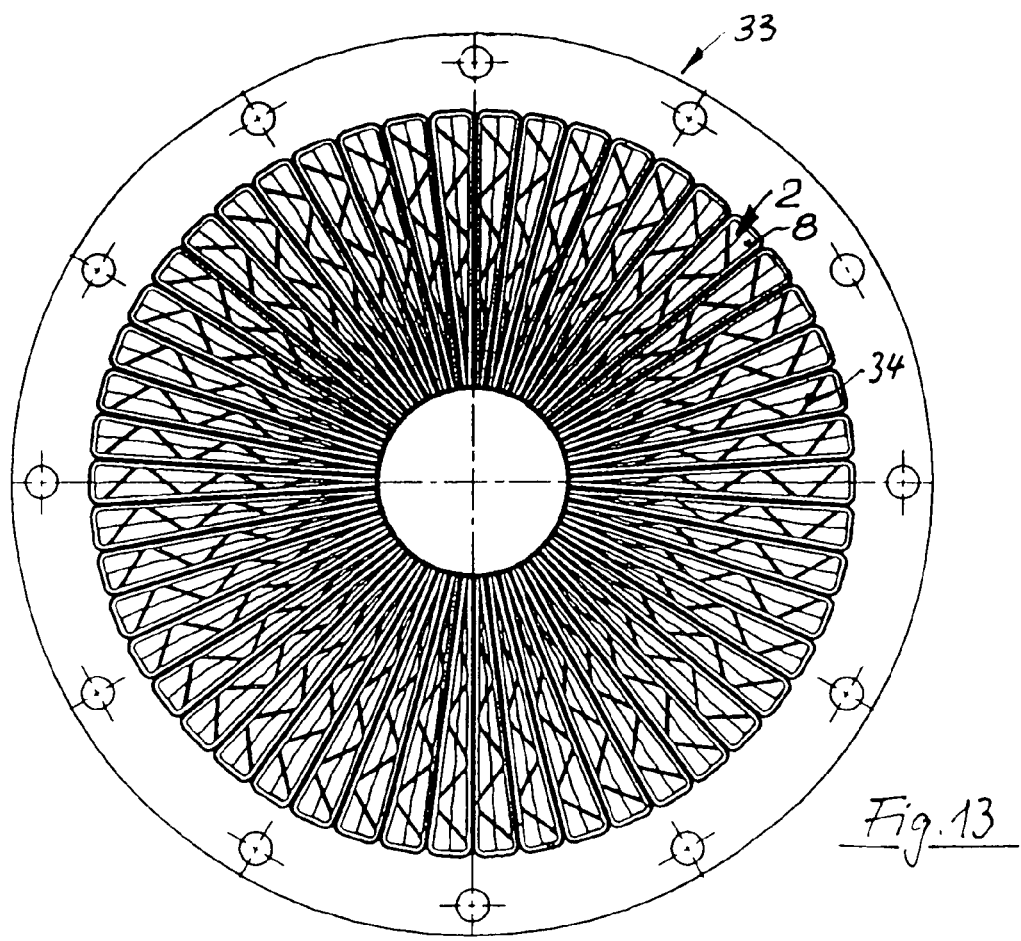
FIG. 13 is a front view of a particle filter with filter pockets reinforced by an insert.

FIG. 1 shows the basic design arrangement of a particle filter 1, which is shown in full in the perspective view of FIG. 5, while representing a filter pocket 2 and showing the end support components which are essential for the construction of a rotationally symmetrical particle filter 1 as shown in FIG. 5. The end support components comprise in the shown embodiment the central support cone 3 disposed at one end and the radial inner retaining ring 4 and the outer support ring 5 disposed at the other end of the filter body. As shown particularly in FIG. 6 the support cone 3 and the inner retaining ring 4 are interconnected by a central support tube 18.

With this central connection, a rigid central support and seal structure are provided. It is particularly advantageous in this connection that the support tube 18 is firmly connected only to one of the end support components, that is, to the retaining ring 4 or to the support cone 3. Preferably, the support tube 18 is firmly connected to the retaining ring 4, particularly by welding, so that the retaining ring 4 forms, together with the support tubes 18 which are joined thereto, a front edge and cover joint at the radially inner ends of the filter pockets 2. The support cone 3 is preferably axially movably supported on the support tube 18 and is firmly connected to the filter pockets 2 at the radially inner edges 7 thereof, preferably welded, so that different expansions of the support tube 18 and the filter pockets 2 do not result in stresses and additional strain on the filter pockets 2.

If, with respect to the expansion behavior, materials are used for the support tube 18, which have an expansion behavior corresponding about to that of the filter pockets 2, it may be expedient in accordance with the invention to firmly connect the support tube 18 to the two end components, that is for example the retaining ring 4 and the support cone 3, for example by welding in order to provide for a particularly rigid support unit.

Such a support unit may also be for example in the form of an assembled support unit which support unit may be used for attachment with respect to a containment such as a filter housing. To this end, it may be expedient to provide the components disposed at opposite ends of the support tube 18 such as the retaining ring 4 and the support cone 3 with through bores, which permit the passage of axial clamping means.

The filter pockets consist of a sintered metal. As base material for the manufacture thereof, rigid thin-walled sinter metal sheets, which may be strengthened by impressed profiles may be used. Also, in accordance with invention filter areas may be formed by sinter metal foils or fleeces, which are disposed on appropriate support structures for example perforated sheets or similar structures. The application of the unstable sinter metal foils or mats on the support structures may be limited to such areas of the support structures in which there is a filter function so that for example edge and joint areas are not covered. As support structures lattice sheets, for example stretched metal sheets may be used. Stretched metal sheets are particularly advantageous in accordance with the invention in connection with a coating of sinter metal applied by a sintering process. In this case, the sinter metal is introduced essentially only into the openings of the support structure. Lattice sheets, also in the form of stretched metal, have the advantage that the openings are so arranged that, in the area of the edges that is for example along the side edges 6 and 7 as shown in FIGS. 1–4, a closed structure or a structure with essentially no openings can be provided. This is advantageous for welding the sidewalls 9, 10 of the filter pockets 2 together. Correspondingly, there may be also in the area of the folded edges of the filter pockets special structures of the support arrangement, that is, particularly of the lattice sheets, which permit folding of the sheets with sharp bends without damaging the sinter metal coating already present on the sheets. It is noted that also coated sheets can be provided with sharp bends without damaging the coating.

FIGS. 1 to 4 show a filter pocket 2 in its geometric configuration with a rectangular basic shape and a triangular cross-section. Of the four end edges 6, 7, 15, 16 of the filter pocket 2, which in the shown embodiment has an oblong shape, one of the front end edges 6 and 7, that is, in the example, the end edge 6, has a pocket opening 8, which, in accordance with the triangular cross-section of the filter pocket 2, becomes smaller toward the radially inner end, and which consequently narrows down at an acute angle also in vertical direction. The pocket opening also determines the area of the top end 6 so that the side walls 9 and 10 of the filter pocket form the legs of the pocket opening 8. As shown in FIGS. 1 and 3, in the area of the pocket opening 8, an insert strip 11 may be provided which extends at least over the radially outer area of the side walls 9 and 10 and extends as a U-shaped yoke with its web 12 over the width of the triangular pocket opening 8 (top wall 17). In addition to providing an advantageous stiffening function in the way of support spokes, which may also be provided independently, the use of such an insert strip 11—analogous to an insert member—facilitates a front end welding, particularly a melt welding of the side walls 9, 10 of the filter pockets 2, which are disposed adjacent each other in the circumferential direction. The web 12 offers also the possibility of fixing the support spring 5 particularly by welding.

The position-correct fixing of the filter pocket 2 with respect to the outer support ring 5 is facilitated by the fact that it is provided with tooth-like radial triangular projections 13, which extend inwardly and engage the filter pockets 2 at their outer ends.

At their radially inner ends, the filter pockets 2 are fixed by the inner retaining ring 4, which engages the filter pockets 2 at the radially inner end edges 6. Depending on the circumstances, the edge area 6 is closed in the engagement area with a corresponding blocking of openings. Analogous to the tooth-like projections 13, the inner retaining ring 4 has tooth-like projections 14 of which two adjacent ones form the engagement area for a filter pocket 2. In accordance with this arrangement, the filter pockets 2 or, respectively, the side walls 9 and 10 thereof form, in the area of the pocket openings 8, quasi radial spokes between the inner engagement ring 4 and the outer support ring 5. With the triangular cross-section of the filter pockets 2 in connection with a sufficient rigidity of the side walls 9 and 10 the filter pockets 2 safely maintain their shape even under the extreme temperature conditions to which a particle filter, particularly a particle filter working with carbon deposit combustion, is subjected.

The inherent rigidity of the filter pockets 2 is enhanced by the particular shape which is characterized in that the filter pockets are narrowed down in a wedge-like fashion in the vertical direction, and, in the rotationally symmetrical arrangement, also radially inwardly. The side walls 8 and 9 extend radially also in a wedge-like manner, that is they converge at their radially inner ends and form at the inner edge 15 of the filter pocket 2 also a wedge edge like the edge 7 at the bottom end of the filter pocket 2 opposite the pocket opening 8. At the radially inner edge 15, the filter pockets 2 are supported by the support tube 18, which also advantageously provides for the separation between adjacent filter pockets 2 in a radial inward direction.

The end wall 17 bridges the side walls 9 and 10 and forms a triangular connection which stiffens the side walls 9 and 10 so that the core surrounded by the filter pockets 2 can be left open for conducting exhaust gases.

The end wall 17 is expediently formed as a single piece together with the side walls 9 and 10 from a plate member. It is for example bent, particularly folded, from the plate member, which, because of the narrow, acutely angled configuration of the end wall 17, has an almost rectangular cross-section. It can be manufactured from correspondingly large area plate members or from roll material with relatively little cutting losses.

With respect to the shown embodiment with a plurality of rotational symmetrical filter bodies forming filter pockets 2, a filter assembly may include about 50 (fifty) adjacently arranged filter pockets 2. Consequently, the radially outwardly opening wedge angle is about 7°. If, as in the shown embodiment, the axial length of the pockets is about twice their radial extent, an axially opening wedge angle of the pockets at the bottom edge thereof of about 3 to 4° is obtained. The width of the end wall 17 at the pocket opening 8 is about ⅛ of the radial extent 24 of the filter pocket 2. The axial length of the filter pocket 2 is indicated in FIG. 2 by the reference numeral 23. If a filter body includes 60 (sixty) filter pockets 2, a radial opening wedge angle of about 16° is obtained. Then a configuration is expedient wherein the width of the pocket opening 8 is between ⅙ and ⅑ of the height 24 of the filter pocket 24.

In connection with the invention, for particle filters with carbon deposit combustion, particularly particle filters with rotationally symmetrical configuration of the filter body, with regard to the filter pockets 2, end wall widths of between 5 and 12 mm, preferably 6–8 mm have been found to be particularly advantageous. This is particularly true for filter bodies with wedge filter pockets which are grouped around a center area and where—with a wedge end wall width of between 5 and 12 mm, particularly 6–8 mm—the number of the filter pockets relative to the diameter of the filter body is in the range of $$0.26 \times D < n < 0.52 \times D$$

wherein D is the diameter of the filter body and n is the number of filter pockets.

In an analogous manner, this also applies to filter bodies based on a non-circular circumference if, in a way equivalent to the respective filter area thereof, one assumes a filter area of the same size for a filter body with circular cross-section or with an annular cross-section including a small core formed by the converging filter pockets, and, vice versa. In this way, filter body configurations can be provided in accordance with the invention with the use of edge-like filter pockets without large research and testing expenses.

Furthermore, particularly with a corresponding number of filter pockets 2, a wedge angle α opening toward the pocket opening 8 of the filter pockets 2 has been found expedient with the relationship:

$$1° < \alpha < 4.5°$$

In connection herewith a ratio of the wedge width B in the area of the pocket opening 8 to the wedge length L corresponding to the filter pocket has been found expedient with the relationship:

$$10 < L/B < 80,$$

Particularly:

$$10 < L/B < 60$$

It has furthermore been found that a determination of the filter area F with respect to the maximum air flow mass m conducted over the filter is expediently:

$$200 < m/F < 350,$$

wherein the air flow mass m is defined in kg/h and the filter area F is defined in m².

A filter optimized in the manner is also particularly advantageous as to its costs.

A medium range, which is of particular interest in practice, is in accordance with the invention the range:

$$250 < m/F < 270.$$

A corresponding, embodiment which is designed for charged motor vehicle Diesel engines with a displacement of about 2 liters and a maximum air mass flow of 450 kg/h and has a filter area of 1.7 m² has, in accordance with the invention, based on a filter body which includes filter pockets grouped around a center part, and, particularly has a filter body of a circular cross-section with about 60 filter pockets, the following dimensions: With respect to the filter pockets an axial length of 250 mm, a filter pocket end wall width of about 7 mm and a radial length of about 60 mm.

The edge area along the end edges 6, 7, and 15, which are hatched in FIG. 2 indicate that the side walls 9, 10 are advantageously joined over the area thereof for example by resistance welding so that the manufacture of the filter pockets 2 can be well controlled also in this respect.

In the area of the end edges opposite the pocket openings 8 the filter pockets 2 are connected centrally to the support cone 3. The support cone 3 extends into the annular space defined by the inner end edges 15 of the filter pockets 2 and the filter pockets 2 are welded together with the support cone 3 in the corner areas between their radially inner end edges 15 and the end edges 7 disposed opposite the pocket openings 8 as shown in FIG. 6.

Such a particle filter 1 with a configuration symmetrical toward the center axis 22 is exposed to a gas flow in the direction as indicated in FIG. 5 by the arrow 19 such that the raw gas flows in the flow direction (arrow 19) is directed into the narrowing wedge spaces 20—opposite the filter pockets 2—which are disposed between the filter pockets 2 and then through the side walls 9, 10 radially into the filter pockets 2. The gas leaves the filter pockets by way of the pocket openings 8 at the downstream end (arrow 21). With the wedge form of the filter pockets 2 in the particle filter arrangement, the gap areas of the particle filter arrangement can be cleaned relatively easily.

The particle filter 1 of this design has large filter surface areas in a relatively small space and is well suited for installation in filter housings which are not shown but which can be integrated in a conventional manner in exhaust systems. The particle filter 1 has such a shape that it can be used in arrangements in which the particle filter can be easily removed for the purpose of cleaning.

The particle filter design according to the invention with its filter pockets 2 of wedge-shaped filter areas of sinter metal, whose obtuse front wedge ends form the pocket openings 8 and whose side walls 9, 10 form the wedge side areas which extend toward the wedge end opposite the pocket opening 8 and toward the edge area extending between the ends of the wedge and which form wedge flanks defining a wedge edge is, because of the large planar filter surface areas formed by the side walls 9, 10, particularly suitable for arrangements wherein the filter areas are formed by flexible sinter metal mats or sinter metal foils. For providing the side walls of the filter pockets 2. These sinter metal mats or foils are supported by support structures for example in the form of perforated sheets or other support structures, particularly lattice panels in the form of stretched metal sheets. Then the side walls 9, 10 are of multi-layer design with the advantage that the sinter metal structures can be designed without consideration of support functions but only with regard to their filter functions.

FIGS. 7–12 show schematically embodiments of the filter pockets according to the invention as they are suitable for manufacturing (FIGS. 8 to 11) and also with a view to providing different volumes for the filter pockets 2 and the opposite spaces. The opposite spaces are the wedge spaces 20 (FIG. 5) which are disposed between adjacent filter pockets 2 and which are delimited by the filter pockets 2 and are open in the opposite direction. In accordance with the invention, the contaminated exhaust gas—raw gas—is preferably conducted into these opposite spaces.

The inward-flow direction is indicated by the arrow 19. Then the particles filtered out of the raw gas are deposited on the outside surfaces of the filter pockets 2 whereas the purified exhaust gas passing through the side walls into the filter pockets exits by way of the pocket openings 8 as indicated in FIG. 5 by the arrow 21.

With respect to the filter pocket 2 shown schematically in FIG. 7, FIGS. 8 to 10 show sections of the corner area 15 formed by the longitudinal edge of the filter pocket 2. The transverse edge corresponding to the edge area 7 is formed in an analog manner. In FIGS. 8 to 10, the side walls 9, 10 of the filter pockets 2 are shown with their end areas joined to form the edge area 15 establishing the longitudinal wedge edge. The side walls 9, 10 are folded over in the area of the edge 15. The respective folds 25 or 26 are shown in FIGS. 8 and 9 as double folds formed be bending, folding, rolling or a similar procedure. Depending on the conditions only a single fold 25, 26 or, beyond the shown structure, multiple folds may be provided so that the side walls 9, 10 which abut each other by way of the folds in the edge area 15 are thickened. This thickened area which may be densified for improved weldability may additionally include an insert as indicated in FIG. 9 by the insert member 27, which may be formed by a strip insert. This strip is disposed in FIG. 9 between the folds 25, 26. FIG. 10 shows an embodiment wherein for the side wall 10 only a single fold 28 is provided which extends around the insert member 30. The same may be provided in an analog manner for the opposite side wall, which is not shown. However, within the scope of the invention, a thickening may also be provided by the edge areas 15 of only one of the side walls 9 or 10 and, correspondingly also in the edge area 7. This applies also to the embodiments of FIGS. 8 and 9.

In accordance with the respective arrangement of the folds 25, 26, 28 and/or the insert members 27, 30 and their dimensioning the end edges 7 and 15 become obtuse or are widened and the volume of the filter pockets 2 is correspondingly increased.

The volume ratios between the filter pockets 2 and the respective wedge-shaped opposite spaces 20 may in accordance with the invention also be achieved in that the filter pockets are arranged in the filter structure in spaced relationship from the adjacent filter pockets so that, in the area of the pocket opening 8, the ends of their side walls 9, 10 are not directly in contact with the corresponding side wall edge of the next adjacent filter pocket 2.

As corresponding space can be bridged as shown in FIG. 11 in that the respective side walls 9. 10 are—in contrast to FIGS. 8 to 10—folded outwardly of the respective filter pocket 2. In FIG. 11, the respective folds are indicated by the numerals 31 and 32 and the side wall 10 of the adjacent filter pocket 2, which is not shown, is indicated only by a dashed line. It is also possible to provide only one of the adjacent filter pocket walls with a fold 31 or respectively 32 or with an insert member which is not shown in FIG. 11. This provides for an advantageous and expedient arrangement as far as the interconnection of adjacent filter pockets in the area of the plane of the filter pocket openings 8 is concerned.

The volume relationship of the filter pockets 2 and the opposite spaces 20 can further be influenced by structures as indicated in FIG. 12, which is a schematic top view in the direction of arrow XII in FIG. 7 showing for the side walls 9, 10 bulging or retracted configurations.

FIG. 13 is a top view of the front end of a particle filter 33 whose design corresponds, in principle, to that of FIG. 5, wherein the front end shows the pocket openings 8 of the filter pockets 2 and it can be seen that support and/or gas guide inserts in the form of spacers 34 are arranged in the filter pockets 2.

FIGS. 14 and 15 are schematic (FIG. 14) and, respectively, perspective views (FIG. 15) of the form of such a spacer 34. It has a corrugated configuration which, as shown in FIG. 13, includes projections engaging and supporting alternately opposite side walls 9, 10 of a filter pocket 2. In accordance with the wedge-shaped cross-section of the filter pockets 2, the wave profile of the corrugations is flattened toward the end areas forming the edges of the filter pockets 2, the edges of the spacer 34 being respectively the longitudinal edge 36 and the transverse edge 37 corresponding to the edges 15 and 7 of the filter pocket 2. The front end views of this insert are symbolized by the wavy lines 38 and 39. FIGS. 14 and 15 further show that, with respect to the flow direction 40 through the filter pocket whose opening 8 is disposed adjacent the transverse edge 41 of the insert 34, the channels 35, which are formed by the wave configuration of the insert, are inclined so that they are fanned out with regard to the longitudinal edge 36 in order to utilize the cross-section profile of the filter pockets for the exhaust gas entering through the side walls and flowing through the filter pocket in the best possible way.

The spacer 34 is installed in the respective filter pocket 2 preferably in the area of the end edges 7 or respectively, 15 corresponding to the transverse and, respectively, longitudinal edge of the insert. The insert may also form an insert member 27, 30 as described with respect to FIGS. 9 and 10.

For a gas flow guide function, the spacer preferably has no transverse passages. It may be for example in the form of a sheet insert. In addition to its support function for the thin-walled sinter surfaces forming side walls 9, 10, the spacer may also have exhaust gas treatment functions for example by catalyst coatings. In addition, the insert forms a heat buffer and thereby provides for an equalization of the temperature distribution.

Figure 16:
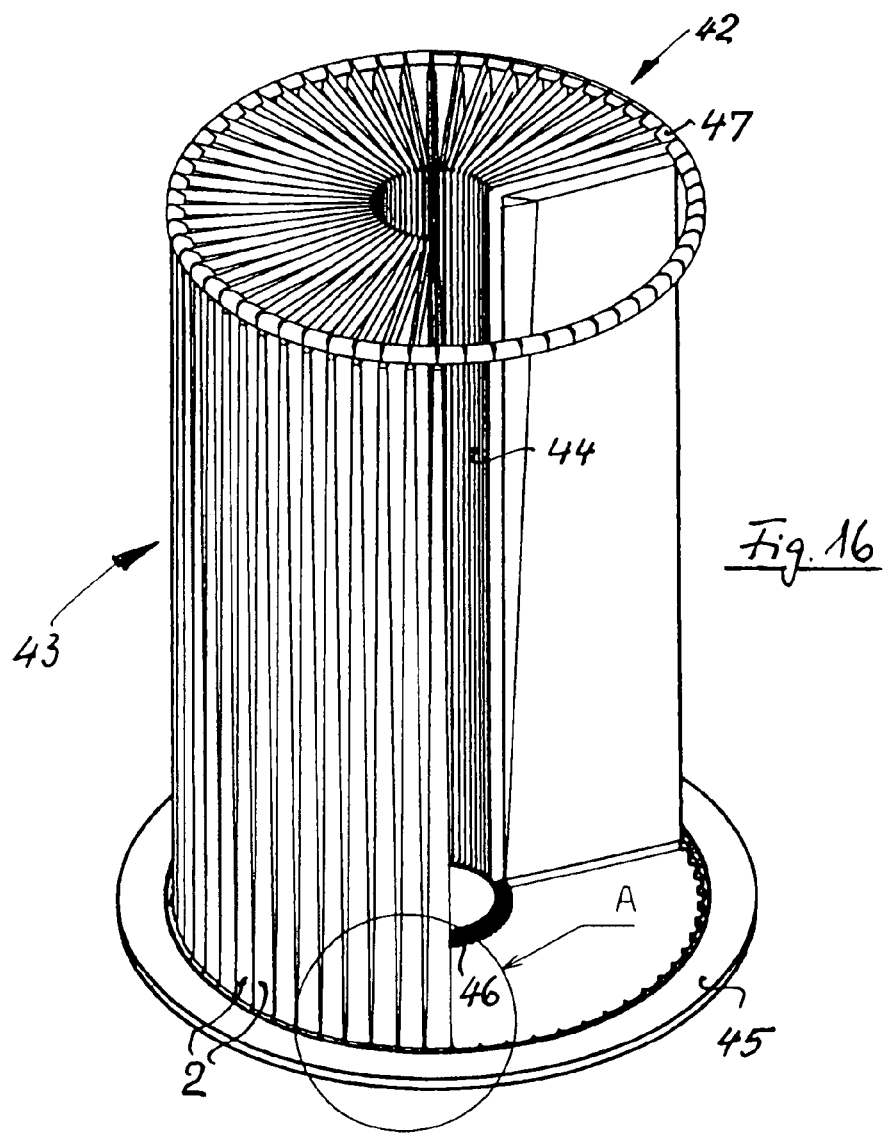
FIGS. 16 and 17 are a representation of a filter body without support core.
Figure 17:
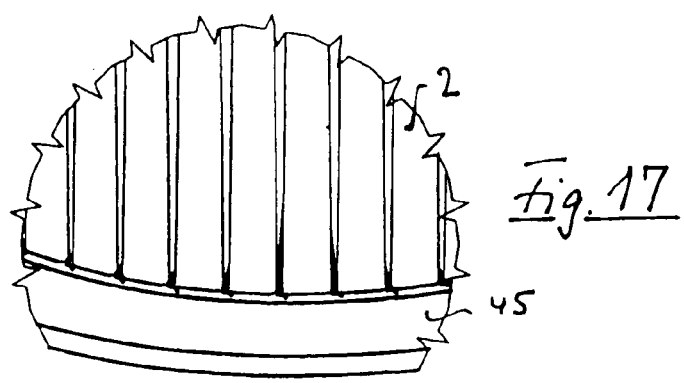
Figure 25:
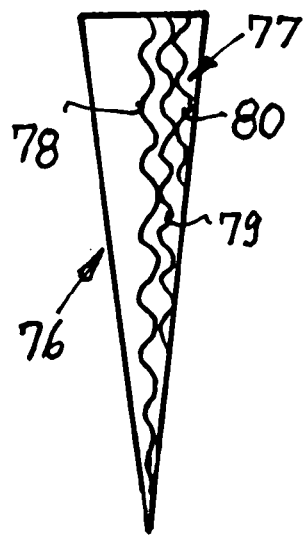

While FIGS. 1 to 5 show the design of a particle filter comprising filter pockets with a closed core, FIGS. 16 and 17 show an embodiment of a particle filter 42 with a core 44, which is open over the length of the filter body 43. In the area of the pocket openings of the filter pockets 2, the core 44 is closed. The filter pockets 2 are supported in the area of their pocket openings by a radially outer support ring 45 and a radially inner centering ring 46 and form, with the transverse edges formed by the end edges 7, a spoke-like connection between the support ring 45 and the centering ring 46. The filter body 43 may be fixed by way of the support ring 45 in a corresponding housing which is not shown. At the opposite end, only a radially outer support ring 47 for engaging the filter pockets 2 is provided and the support rings may be connected to the respective filter pockets 2 by welding. At their radially inner end, the longitudinal edges of the filter pockets 2 abut one another and provide mutual support. A gas-tight connection is not necessary. A radial gas flow is actually advantageous for a uniform utilization of the filter areas also in the radially inner area of the side walls.

FIG. 17 shows enlarged the area of connection between the filter pockets 2 and the outer support ring 45, which connection may be established also by a casting procedure.

The scope of the invention covers also filter bodies with wedge-like filter pockets which do not have the rotational symmetrical configuration as shown and described for the earlier embodiments. With varying radial depth of the filter pockets for example oval filter bodies can be provided as well as filter bodies with reduced radial depth areas, that is, out of round filter bodies.

Figure 19:
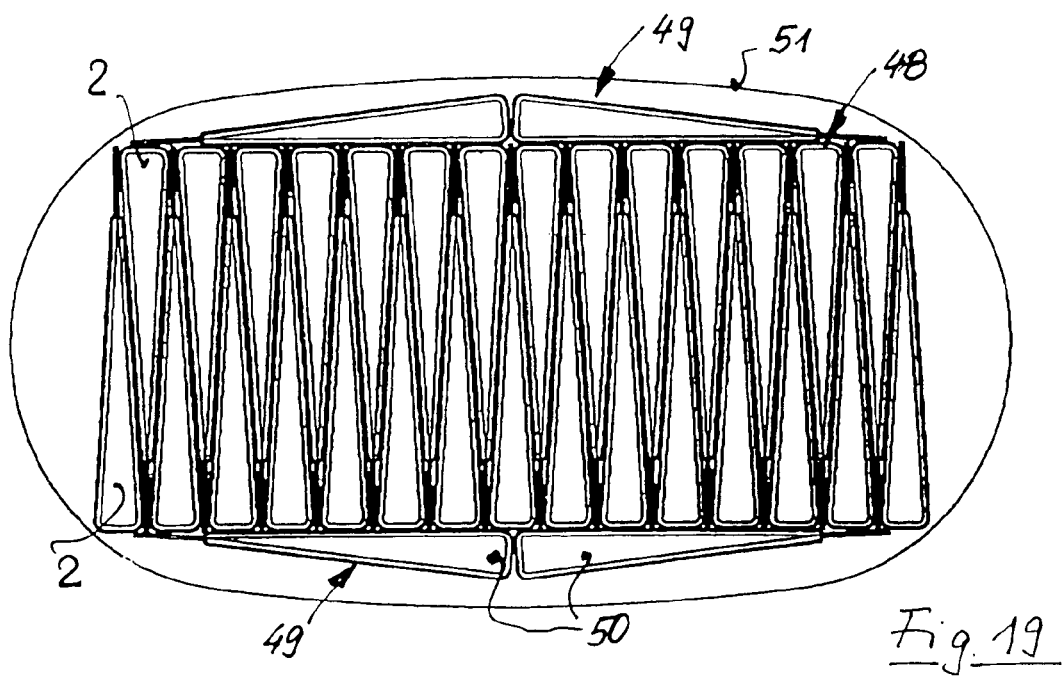
FIG. 19 shows an assembled arrangement of filter pockets of a particle filter.

An example of such a filter body is shown in FIG. 19. Here the filter pockets, which have all the same size and which have all pocket opening 8 facing the same plane, are assembled in opposite directions with respect to one another so that basically a rectangular filter body 48 is formed. For a mutual connection of the filter pockets 2, this rectangular filter body may be provided at the top and the bottom with a cover 49 which is formed by filter pockets 50, which are disposed adjacent each other at the back and whose side walls abut the filter pockets 2 of the rectangular filter body 48. In this way, additional filter volume can be obtained and the housing 51 may have a flat-oval shape as it is common for particle filters. Also, with such an arrangement, a catalytic coating may be provided, whereby expediently the carbon ignition temperature can be reduced and/or the nitrogen oxide reduction and/or the production of $NO_2$ can be enhanced. At the raw gas side, a catalytic coating is expediently provided which reduces the carbon ignition temperature and the $NO_2$ production and at the clean gas side a catalytic coating is selected which enhances the dissociation of nitrogen oxides.

FIG. 20 shows in a schematic top view of the sides of the filter pockets 52 including the pocket openings, a line arrangement of filter pockets which are so arranged that the triangular cross-sections of adjacent pockets are oriented in opposite directions. It is further shown that, with the stacking of several lines 53, 54 of oppositely oriented filter pockets, irregular circumferential contours can be formed which may be expedient in vehicles for space availability reasons.

FIG. 18 shows another embodiment of the invention with a filter body 53, which is constructed of filter pockets 56, 57. The arrangement shown is particularly suitable for particle filters with large diameters wherein the relatively large radial height of the filter pockets would result also in a large wedge back web width resulting in a less advantageous ratio of filter surface to filter volume. In order to avoid this result, the filter pockets 50 extending over the full pocket length between the core 58 and the circumference 59 are provided at their outer ends with a flattened wedge angle so that between adjacent filter pockets 56 radially outwardly expanding wedge spaces are formed in which radially shorter filter pockets 57 are arranged.

FIG. 21 is a cross-sectional view, of a filter 1 according to the invention of which only the raw gas entrance area—the gas inlet flow direction is indicated by the arrow 60—is shown, wherein the housing 61 of the particle filter is provided with an inlet cone 62. The filter body is designated by the reference numeral 63 and comprises filter pockets 64 according to the invention, which extend into the inlet cone 62 for optimizing space utilization. With the stepped arrangement of the filter bodies 63 in the area of the inlet cone 62 and with the spacing provided at the filter housing 61, an essentially uniform gas supply to the filter pockets 64 is ensured. A corresponding arrangement may be expedient also at the outlet end of the filter body housing.

FIGS. 22 to 24 show various embodiments of spacers 65, 66 serving as support and gas flow guide inserts. A development of the spacer 65 is shown in FIG. 24. It can be seen herefrom that the individual layers 67, 68 are disposed on top of each other with the wave profiles intersecting each other. In this way, the purified gas flowing through the filter pocket is subjected to intense turbulence.

In the embodiment of FIG. 22, the spacer 65 is folded to a triangular shape and provided with an outer layer 67, which essentially forms the envelope for inner layers of which one layer 68 is shown. The layers 67, 68 form essentially equal sided triangles, which are disposed one within another in a folded way, and which correspond to the contour of the filter pockets 69. The filter pockets are only indicated by their circumference and include, as already described, side walls 9, 10 and an end wall 17 forming the pocket back. The spacer has a backwall 70 corresponding to the end wall 17 of the filter pocket where the spacer layers 67 and 68 are interconnected for example by welding and wherein the wave structure of the over-laying layers may be eliminated for improved weldability, as shown in the figures. However, an interrupted wave configuration is also within the scope of the invention. Notwithstanding the respective embodiments, it has been found to be expedient to maintain also in the area of the end wall 17 a space between the back wall 70 and the end wall 17 to maintain a gas passage area. This may also be achieved by ear-like extensions 71 of the back wall 70 in the transition area to the legs 71, 73 of the outer layer 67. FIG. 22 shows the outer layer 67 with its legs 72, 73 extending into the area of the wedge edge formed by the corner area 15, and the inner layer 68, which is, in accordance with the available space, somewhat shorter whereas FIG. 23 shows a reversed arrangement that is an inner layer 74 which extends to the corner area 15, while the outer layer 75 is shorter because of reduced space availability. The installation of the respective spacer into the respective filter pocket can be accomplished also with the embodiment described here, in that, in the area of one or several end edges 7 or, respectively, 15, it is connected to the filter pocket for example by welding during the welding of the side walls 9, 10.

Figure 26:
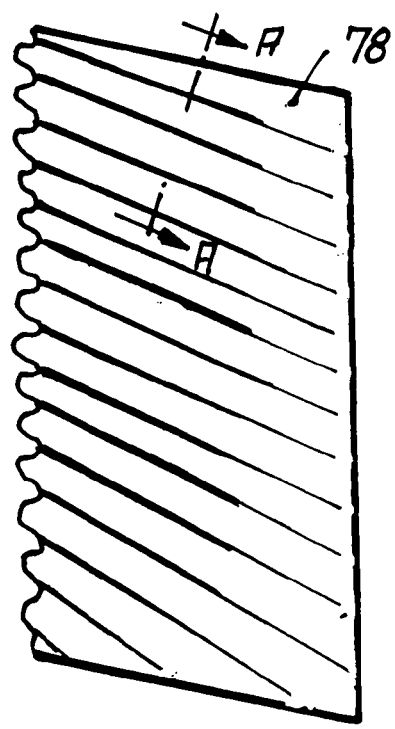
FIGS. 26 to 28 are view of various spacer arrangements.
Figure 27:
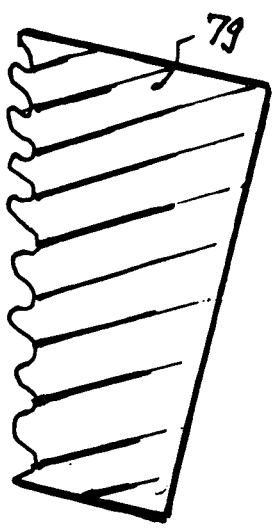
Figure 28:
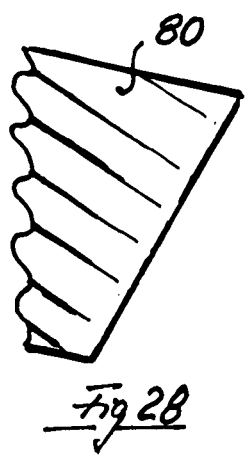

FIGS. 25 to 28 shows a multi-layer construction of a spacer 77 for a filter pocket 76. FIGS. 26 to 28 illustrate the layers 78, 79, 80, which are stepped in size in cross-section according to the space available within the wedge-shaped filter pocket 76 and which have corrugations which flatten toward one end and are oriented so as to cross over one another so that also here the gas flowing through the filter pocket 76 is subjected to intense turbulence. The individual layers 78 to 80 may be interconnected for example by welding and, in this way, form a pocket which is not shown. The turbulence in the purified gas achieved by a spacer of this design is advantageous particularly in connection with a catalytic coating of the spacer layers 78 to 80. For the coating of the individual layers 78 to 80, different types of coatings and different materials may be used.

Figure 29:
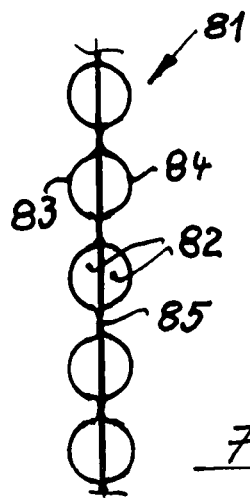
FIG. 29 shows an embodiment of a washboard-like corrugated spacer with slots extending transversely to the wave structure and having subsequent sections punched out in opposite directions and separated by the slots.

FIG. 29 shows further in a schematic cross-sectional view, the location of which is indicated in FIG. 26 by the cross-section line A—A, for the individual wave channels 82 of a spacer layer in axially subsequent sections, protrusions 83, 84, which are stamped out in opposite directions. This is possible by a corresponding slitting in a direction transverse to the extension of the respective wave channel 82. The remaining webs are indicated in FIG. 29 by the reference numeral 85.

By way of spacers of the type described, which generally include support and or gas guide functions, also a heat absorption and therefore a temperature equalization, particularly the elimination of temperature peaks in the gas, can be achieved which is advantageous particularly in connection with catalytic coatings since more uniform operating temperature can be achieved in this way.

Spacers may, in accordance with the invention, also be formed by open-pore metal foams or similar structures.

What is claimed is:

1. A particle filter for exhaust gases of internal combustion engine, said particle filter comprising a filter body (1) including filter pockets (2) formed from sinter metal sheets, said filter pockets (2) being wedge-shaped with a triangular cross-section having a blunt end with a pocket opening (8) and transverse and axial wedge edges (7, 15) formed by converging side walls (9, 10), said transverse wedge edges (7) being disposed opposite said blunt end, and said axial wedge edges (15) extending between said transverse edge (7) and an apex of the blunt end of said wedge edge, and a wedge cover (17) disposed opposite the axial wedge edge (15) and extending between the side walls (9, 10), said filter pockets (2) being arranged adjacent one another such that between adjacent filter pockets (2) corresponding opposite spaces are formed with openings facing in a direction opposite said blunt end pocket openings (8), said side walls (9, 10) of adjacent filter pockets (2) being, in the area of at least one side wall edge of adjacent side walls of said filter pockets (2), spaced from one another by a predetermined distance by bridging means (25–28, 30–32) so as to increase the width between said opposite side walls along said at least one side wall edge.

2. A particle filter according to claim 1, wherein the bridging means between said walls (9, 10) of said filter pocket (2) in the area of said at least one side wall edge is a spacer member (27, 30) disposed between the side wall edges.

3. A particle filter according to claim 1, wherein said bridging means for spacing said side walls (9, 10) of said filter pockets (2) from one another at their wall edges are bent-over or folded over edge areas (25, 26, 28, 31, 32) of said side walls (9, 10).

4. A particle filter according to claim 1, wherein at said blunt wedge end, said filter pockets have a ratio of wedge height (24) to the width (B) of the wedge cover wall (17) of between 5 and 16.

5. A particle filter according to claim 4, wherein the ratio of wedge height (24) to the wedge cover wall width at the opening (8) is about 8.

6. A particle filter according to claim 1, wherein said filter pockets (2) are grouped around a central support tube (18) to form said filter body and said filter side walls (9, 10) are provided with said bridging means at their axial edges extending along said support tube (18).

7. A particle filter according to claim 1, wherein said filter pockets (2) include radially extending spacer inserts (34) disposed between said pocket side walls (9, 10) for supporting said pocket walls (9, 10) and for guiding exhaust gas flow and for absorbing heat.

8. A particle filter according to claim 7, wherein said spacer inserts (34) are provided with a catalytic coating.

9. A particle filter according to claim 6, wherein the transverse edges (7) of said pockets (2) are acutely angled and are fixed at their radially outer ends by a support ring (47).

10. A particle filter for exhaust gases of internal combustion engines, said filter comprising a filter body (1) with filter pockets (2) formed from sinter metal sheets, said filter pockets being wedge-shaped with a triangular cross-section having a blunt end with a pocket opening (8) and wedge edges (7, 15), which are formed by converging pocket side walls (9, 10), one of said wedge edges (7) being a transverse edge disposed opposite said blunt end and the other of said wedge edges (15) extending longitudinally between said transverse edge (7) and an apex of said blunt end of said filter pockets (2) defining therebetween outer spaces which correspond to the filter pocket interior spaces but which are open in a direction opposite to said pocket openings (8) said outer spaces having a volume different from that of said filter pocket interior spaces.

* * * * *

UNITED STATES PATENT AND TRADEMARK OFFICE
CERTIFICATE OF CORRECTION

| | | |
|---|---|---|
| PATENT NO. | : 7,044,992 B2 | Page 1 of 1 |
| APPLICATION NO. | : 10/740652 | |
| DATED | : May 16, 2006 | |
| INVENTOR(S) | : Gerhard Jurgen Frankle et al. | |

It is certified that error appears in the above-identified patent and that said Letters Patent is hereby corrected as shown below:

On the title page, and column 1, line item [54]:

In the title of the invention as printed on the issued patent the title should read: PARTICLE FILTER FOR EXHAUST GASES OF INTERNAL COMBUSTION ENGINES rather than PARTICLE FILTER FOR EXHAUST GASES OF INTERNAL COMBUSTION ENGINE ENGINES.

Signed and Sealed this

Fifteenth Day of August, 2006

JON W. DUDAS
*Director of the United States Patent and Trademark Office*